2,760,985

PREPARATION OF ACETALS

Donald M. Burness, Rochester, N. Y., assignor to Eastman Kodak Company, Rochester, N. Y., a corporation of New Jersey No Drawing. Application May 26, 1953,
Serial No. 357,644

5 Claims. (Cl. 260—594)

This invention relates to the preparation of acetals of $\beta$-ketoaldehydes and is particularly concerned with the preparation of $\beta$-ketobutyraldehyde dimethyl acetal.

The $\beta$-ketoacetals are useful intermediates in the synthesis of $\alpha,\beta$-unsaturated aldehydes and have been used as intermediates in the preparation of sulfamerazine. Several methods have been proposed for preparing ketoacetals. Nelles (United States Patent 2,091,373) set out a preparation involving an alkyl 2-chloro-vinyl ketone but this synthesis is difficult to handle on a commercial scale because of the nature of the intermediates. In 1943, Kaushal (J. Indian Chem. Soc., 20, 53) reacted sodium hydroxymethylene acetone with ethyl alcohol in the presence of ethyl bromide to form the $\beta$-ketovinyl ether. This method actually forms a mixture of the $\beta$-ketovinyl ether and the $\beta$-ketoacetal as shown by subsequent work. Dyer et al (J. A. C. S., 56, 222 (1934)) had previously shown that the sodium formyl derivatives, specifically sodium formyl acetate, formed acetals with ethyl alcohol in the presence of hydrogen chloride. Sugasawa (Japanese Patent 177,821) and, later, Richmond (United States Patent 2,570,713) reacted sodium hydroxymethylene acetone with ethyl alcohol in the presence of hydrogen chloride to form $\beta$-ketobutyraldehyde diethyl acetal but the yield was low (20%) and the product contained a sizeable quantity (24%) of triacetyl benzene. I have also found that the Richmond process, like that of Kaushal, gives a large amount of $\beta$-ketovinyl ether in the product which is difficult to separate and which greatly lessens the yield of the desired $\beta$-ketoacetal.

It is accordingly an object of this invention to provide a novel method of preparing $\beta$-ketoacetals in much higher yields than were obtained by processes employed heretofore.

It is a further object of this invention to provide a new method of minimizing and almost completely obviating the formation of $\beta$-ketovinyl ethers in the preparation of $\beta$-ketoacetals with a consequent increase in yield and quality of the product and a very substantial decrease in cost and processing of the desired $\beta$-ketoacetals.

Another object of the invention is to prepare $\beta$-ketoacetals by a novel process which does not yield triacetylbenzene as an unwanted byproduct.

Another object of the invention is to greatly facilitate the production of commercial quantities of an acetal of $\beta$-ketobutyraldehyde of good quality and low cost.

Another object of the invention is to provide a simple but highly effective method for obviating the undesirable side reactions inherent in hitherto employed processes for preparing $\beta$-ketoacetals.

Another object of the invention is to prepare directly and in yields of as much as 70% or more the dimethyl acetal of $\beta$-ketobutyraldehyde unmixed with objectionable amounts of either the corresponding $\beta$-ketovinyl ether or triacetylbenzene.

Other objects will be apparent from the description and claims which follow.

These and other objects are attained by means of this invention as described in detail hereinafter with particular reference to certain preferred embodiments thereof.

The process embodying the invention in general comprises bringing together an alkali metal enolate of a $\beta$-ketoaldehyde, anhydrous methyl alcohol and anhydrous hydrogen chloride under conditions such that the pH of the resulting mixture is maintained below about 1 throughout the mixing together, maintaining the pH of the reaction mixture below about 1 while the reaction proceeds, then carefully neutralizing the resulting reaction product to a pH of 6 to 7, and separating the $\beta$-ketoacetal from the neutralized mixture at the pH of 6 to 7. The pH values referred to and as used hereinafter represent the apparent pH values for the non-aqueous system as measured on a Beckmann pH meter.

The exact reasons why the formation of $\beta$-ketovinyl ether and triacetyl benzene is obviated and the yield of $\beta$-ketoacetal is raised to as much as 70% or more by the process embodying the invention are not clearly understood. The improved results obtained appear to be dependent upon the particular combination of conditions and reactants, however, since the substitution of ethyl alcohol for methyl alcohol greatly decreases the yield of $\beta$-ketoacetal and higher pH values than those claimed herein result in formation of large amounts of triacetyl benzene and $\beta$-ketovinyl ether. This is particularly surprising since acid is ordinarily employed to cause formation of triacetyl benzene and increasing the acidity over that employed heretofore would therefore be expected to increase the formation of triacetyl benzene rather than to obviate its formation in objectionable amounts. It is further unexpected to find that the pH conditions throughout the bringing together of the reactants as well as their reaction exerts such a marked influence on the yield of $\beta$-ketoacetal and the presence or absence of substantial amounts of $\beta$-ketovinyl ether. Thus, employing exactly the same relative amounts of reactants, the results are vastly different when the sodium enolate of the $\beta$-ketoaldehyde is progressively added to the anhydrous methanol containing the anhydrous hydrogen chloride so that the pH is always below about 1 and preferably between 1.0 and 0.0, than when the alcoholic hydrogen chloride is added to the sodium enolate of the $\beta$-ketoaldehyde, even though the final mixture contains exactly the same amount of each reactant.

Thus when sodium formyl acetone (also known as sodium hydroxymethylene acetone) is added to methanolic hydrogen chloride under conditions such that the pH is maintained below about 1; and the mixture, after reaction, is neutralized to a pH not higher than 7 and desirably from 6 to 7 for the separation of $\beta$-ketoacetal, the yield of $\beta$-ketoacetal is at least 70% and the formation of triacetyl benzene and $\beta$-ketovinyl ether is greatly minimized. This is in contrast to yields of $\beta$-ketoacetal below 25% and the formation of equal or greater amounts of triacetyl benzene and $\beta$-ketovinyl ether when the order of addition is reversed.

Similarly, when the reaction mixture is neutralized following completion of the reaction, the pH must be carefully adjusted to the range of 6 to 7 and the $\beta$-ketoacetal separated at this pH or a substantial amount of the $\beta$-ketoacetal converts to $\beta$-ketovinyl ether or to other unidentified products which appear to be polymeric in nature.

In practicing this invention, the alkali metal enolate of the desired $\beta$-ketoaldehyde can be prepared in any desired manner. Desirably, however, the enolate is prepared by reacting an alkali metal, such as sodium or potassium, or an alkali metal alkoxide, such as sodium methoxide, sodium ethoxide, sodium isopropoxide or the corresponding potassium or other alkali metal alkoxides, with an alkyl formate, such as methyl or ethyl formate, and a ketone, such as acetone, methyl ethyl ketone, methyl vinyl ketone or the like, to form the alkali metal enolate.

This is illustrated by the following equation:

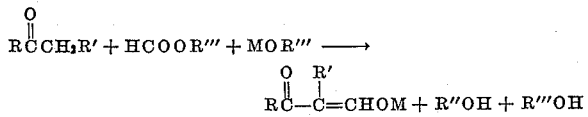

wherein R is an alkyl or aralkyl group, R' is either hydrogen or an alkyl group, R'' is an alkyl group, and R''' is an alkyl group, and M is an alkali metal.

In the preferred embodiment, the ketone is acetone and the product is the alkali metal formyl acetone which is then employed for making β-ketobutyraldehyde dimethyl acetal in accordance with this invention. The alkali metal enolate is desirably prepared by slurrying the alkali metal alkoxide and the formate, either with or without an inert solvent, such as petroleum ether, and then adding the ketone to the slurry. With acetone as the ketone, the alkali metal formyl acetone forms as a creamy solid which can be readily separated from the reaction mixture, although separation of the enolate prior to the subsequent reaction is not necessary for good results.

The alkali metal enolate of the β-ketoaldehyde is then progressively added to a solution of anhydrous hydrogen chloride in methyl alcohol. The methanolic hydrogen chloride solution desirably has a normality of 3 to 6 and is employed in a sufficient quantity that the reaction mixture after addition of all of the enolate will have a pH below about 1 and preferably between 0.0 and 1.0. During addition of the enolate to the methanolic hydrogen chloride, the mixture is agitated to maintain the desired pH throughout the mixture, and the temperature of the mixture is maintained in the range of 15–25° C.

Upon completion of the addition and with the pH maintained below about 1, the reaction mixture is agitated and held at a temperature of 15–25° C. until the reaction is substantially complete. Usually a period of from 2 to 6 hours is sufficient for completing the reaction. Upon completion of the reaction, the excess acid in the reaction mixture is neutralized carefully until the mixture has a pH not higher than 7 and preferably from 6.0 to 6.5. The neutralization can be accomplished in accordance with well-known practice where close control of the pH is possible. Particularly good results are obtained by employing a solution of alkali metal alkoxide, such as sodium methoxide, in methyl alcohol as contrasted to the use of aqueous solutions of sodium or potassium carbonate which lead to β-ketovinyl ether or other by-product formation unless extreme care is exercised.

Neutralization of the reaction mixture with a sodium alkoxide in non-aqueous media causes precipitation of large amounts of sodium chloride. This is filtered from the reaction mixture in the usual manner, and entrapped β-ketoacetal is washed from the filter cake with solvent such as methyl alcohol.

The β-ketoacetal is then recovered from the neutralized mixture with the mixture maintained at a pH of 6 to 7. Separation of the β-ketoacetal can be effected by any of the well-known procedures such as adsorption or the like but is desirably effected by vacuum distilling the solvent away from the β-ketoacetal. If desired the β-ketoacetal can then be redistilled for further purification.

The invention is best illustrated by reference to a preferred embodiment thereof as detailed in the following examples, it being understood that the examples are illustrative and are not intended to limit the scope of the invention, as described herein and defined by the claims, unless otherwise indicated.

*Example 1*

A 1.0 mole portion of methyl formate was charged into a reactor provided with a reflux condenser and an agitator. One mole of sodium methoxide was then slowly added to the methyl formate with the solution being cooled and agitated throughout the addition. After completing addition of the sodium methoxide, the mixture was agitated under forced reflux for an additional 15 minutes to form a thick white slurry. Slightly more than one mole of acetone was then added to the slurry over a period of about 15 minutes; and, after addition, the mixture was refluxed and stirred for one hour. At the end of the reflux period, the sodium formyl acetone which precipitated as a solid was separated from the reaction mixture and dissolved in methyl alcohol.

*Example 2*

The alkali metal enolate is readily prepared employing an alkali metal instead of the alkoxide. Thus, 48 g. of powdered sodium in 500 ml. of dry ether was cooled to a temperature of 0–10° C., and a mixture of 3 moles of ethyl formate and 2 moles of acetone was slowly added with stirring and cooling to maintain the lowered temperature. After addition of the formate-acetone mixture over a period of 90 minutes, the reaction mixture was allowed to stand overnight. The sodium formyl acetone was then filtered off, washed with ether and dried over calcium chloride. The product weighed 205 g. or a 91.5% yield of sodium formyl acetone as a cream colored solid.

*Example 3*

A 5 to 6 normal solution of hydrogen chloride was prepared by dissolving 1.1 moles of anhydrous hydrogen chloride in 200 cc. of methyl alcohol. The methanol solution of sodium formyl acetone as prepared in Example 1 was then progressively added to the methanolic hydrogen chloride over a period of about 30 minutes while the mixture was being stirred and the temperature maintained at 15–25° C. At the end of such addition, the measured pH of the mixture was in the range of 0.0 to 1.0. The reaction mixture was then stirred at a temperature of 20–25° C. for 4 hours to allow reaction to go to completion. Following the reaction, the mixture was neutralized by the careful addition of a solution of sodium methoxide in methyl alcohol until a pH of 6.0–6.5 was reached. The solution was then filtered to remove the sodium chloride which salted out, and the filter cake was washed with methyl alcohol. The resulting filtered product was then distilled, first at atmospheric pressure and a temperature of about 50° C., then under vacuum at 50° C. to remove solvent from the product. The resulting crude β-ketobutyraldehyde dimethyl acetal was recovered and distilled at 55–56° C. at 8–10 mm. Hg to give a purified product in 70% yield having $N_d^{20}=1.4130–1.4162$ and $$E_{1\ cm.}^{1\%}(244m\mu)=68$$

maximum and containing less than 0.1% water. The product contains only minor amounts of the β-ketovinyl ether and no substantial amount of triacetyl benzene is formed during the preparation. Similarly improved results are obtained with other alkali metal enolates of this and other β-ketoaldehydes when reacted with methyl alcohol and hydrogen chloride in accordance with this invention.

This invention thus provides a simple but highly effective method of preparing β-ketoacetals in greatly improved yield and free of objectionable amounts of undesired side products such as triacetyl benzene and β-ketovinyl ethers. The exact reason why the combination of methyl alcohol, hydrogen chloride and controlled pH conditions gives such improved results is not clearly understood since the mechanism of the reaction and the exact nature of the enolic intermediates under these conditions is not known at this time. Changes in the reaction conditions such as a change in pH or in the alcohol do change the mechanism of the reaction, however, to a very marked degree.

Although the invention has been described in considerable detail with particular reference to certain preferred embodiments thereof, it will be understood that variations and modifications can be effected unless otherwise indicated without departing from the spirit and scope of the invention as described hereinabove and as defined in the appended claims.

I claim:

1. In the process of preparing an acetal of a $\beta$-ketoaldehyde by reacting an alkali metal enolate of a $\beta$-ketoaldehyde with an aliphatic monohydric alcohol in the presence of hydrogen chloride, the method of improving the yield of acetal and decreasing the formation of ketovinyl ether and triacetyl benzene which comprises effecting the reaction at a pH below about 1 employing methyl alcohol as the aliphatic monohydric alcohol, neutralizing the reaction mixture, following reaction, to a pH not lower than 6 and not higher than 7 and separating the acetal from the neutralized mixture.

2. The method which comprises adding an alkali metal enolate of a $\beta$-ketoaldehyde to anhydrous methyl alcohol containing sufficient anhydrous hydrogen chloride to maintain the pH of the resulting mixture below about 1 throughout said adding, reacting said enolate and said methyl alcohol at said pH, thereafter neutralizing the resulting reaction mixture to a pH of from 6 to 7, and separating dimethyl acetal of said $\beta$-ketoaldehyde from the neutralized mixture while maintaining said mixture at said pH of 6 to 7.

3. The method which comprises adding alkali metal formyl acetone to anhydrous methyl alcohol containing anhydrous hydrogen chloride in an amount sufficient to maintain the pH of the resulting mixture below about 1 throughout said adding, reacting said alkali metal formyl acetone with said methyl alcohol at said pH below about 1, thereafter neutralizing the resulting reaction mixture to a pH of from 6 to 7, and separating $\beta$-ketobutyraldehyde dimethyl acetal from the neutralized mixture while maintaining said mixture at said pH of 6 to 7.

4. The method which comprises adding sodium formyl acetone to anhydrous methyl alcohol containing anhydrous hydrogen chloride, said hydrogen chloride being present in an amount sufficient to maintain the pH of the resulting mixture below about 1 throughout said adding, maintaining said resulting mixture at said pH below about 1 until reaction between said sodium formyl acetone and said methyl alcohol is substantially complete, thereafter neutralizing the reaction mixture to a pH of from 6 to 7, and separating $\beta$-ketobutyraldehyde dimethyl acetal from the neutralized mixture while maintaining said neutralized mixture at said pH of 6 to 7.

5. The method which comprises progressively adding sodium formyl acetone to anhydrous methyl alcohol containing a sufficient amount of anhydrous hydrogen chloride to maintain the pH of the resulting mixture below about 1 throughout said adding, maintaining said resulting mixture at said pH below about 1 until reaction between said sodium formyl acetone and said methyl alcohol is substantially complete, thereafter neutralizing the reaction mixture to a pH of from 6 to 7, filtering precipitated salts from the neutralized mixture, and vacuum distilling $\beta$-ketobutyraldehyde dimethyl acetal from said neutralized mixture while maintaining said mixture at said pH of 6 to 7.

References Cited in the file of this patent
UNITED STATES PATENTS

| | | |
|---|---|---|
| 2,378,573 | Natta | June 19, 1945 |
| 2,570,713 | Richmond | Oct. 9, 1951 |